United States Patent
Cochran et al.

[11] Patent Number: 5,440,265
[45] Date of Patent: Aug. 8, 1995

[54] DIFFERENTIAL/COHERENT DIGITAL DEMODULATOR OPERATING AT MULTIPLE SYMBOL POINTS

[75] Inventors: Bruce A. Cochran, Mesa; Ronald D. McCallister; Brendan J. Garvey, both of Scottsdale, all of Ariz.

[73] Assignee: Sicom, Inc., Scottsdale, Ariz.

[21] Appl. No.: 306,112

[22] Filed: Sep. 14, 1994

[51] Int. Cl.⁶ ............... H04L 27/14; H04L 27/22
[52] U.S. Cl. .......................... 329/300; 329/304; 329/341; 375/324; 375/362
[58] Field of Search ............ 329/300, 304, 341; 375/80, 111, 113

[56] References Cited

U.S. PATENT DOCUMENTS

| | | | |
|---|---|---|---|
| 4,491,805 | 1/1985 | Laures et al. | 331/18 |
| 4,856,027 | 8/1989 | Nakamura et al. | 375/81 |
| 5,097,220 | 3/1992 | Shimakata et al. | 329/306 |
| 5,377,232 | 12/1994 | Davidov et al. | 375/80 |

OTHER PUBLICATIONS

Stanford Telecommunications, Inc., ASIC & Custom Products Short Form Catalog, Aug. 1993, pp 1 through 8.
Alberty et al., "A New Pattern Jitter Free Frequency Error Detector", IEEE Transactions On Communications, vol. 37, No. 2, Feb. 1989, pp. 159–163.

*Primary Examiner*—Siegfried H. Grimm
*Attorney, Agent, or Firm*—Lowell W. Gresham; Jordan M. Meschkow; Mark M. Takahashi

[57] ABSTRACT

Symbols (18) of a burst (12) are sub-divided into symbol sections (20). Each symbol section (20) is sampled and converted into polar coordinates. A buffer bank (38) selectably delays the samples and replays a preamble (14). A demod bank (40) includes a coherent demod (58) and several differential demods (60). Each differential demod (60) processes its own stream of symbol sections (20). The differential demods (60) feed a preamble detector (66) and a symbol synchronization circuit (62). The symbol synchronization circuit (62) identifies the symbol section (20) which yields the smallest magnitude of frequency errors. This symbol section (20) is processed by the coherent demod (58) to acquire carrier phase and recover data. The coherent demod (58) is implemented in the phase domain so that only oscillation signal phase data need be generated in phase locked loops. Two phase locked loops (110, 112) operate in parallel but with initial reference phase offsets so that at least one of the two loops will not experience hang-up.

36 Claims, 8 Drawing Sheets

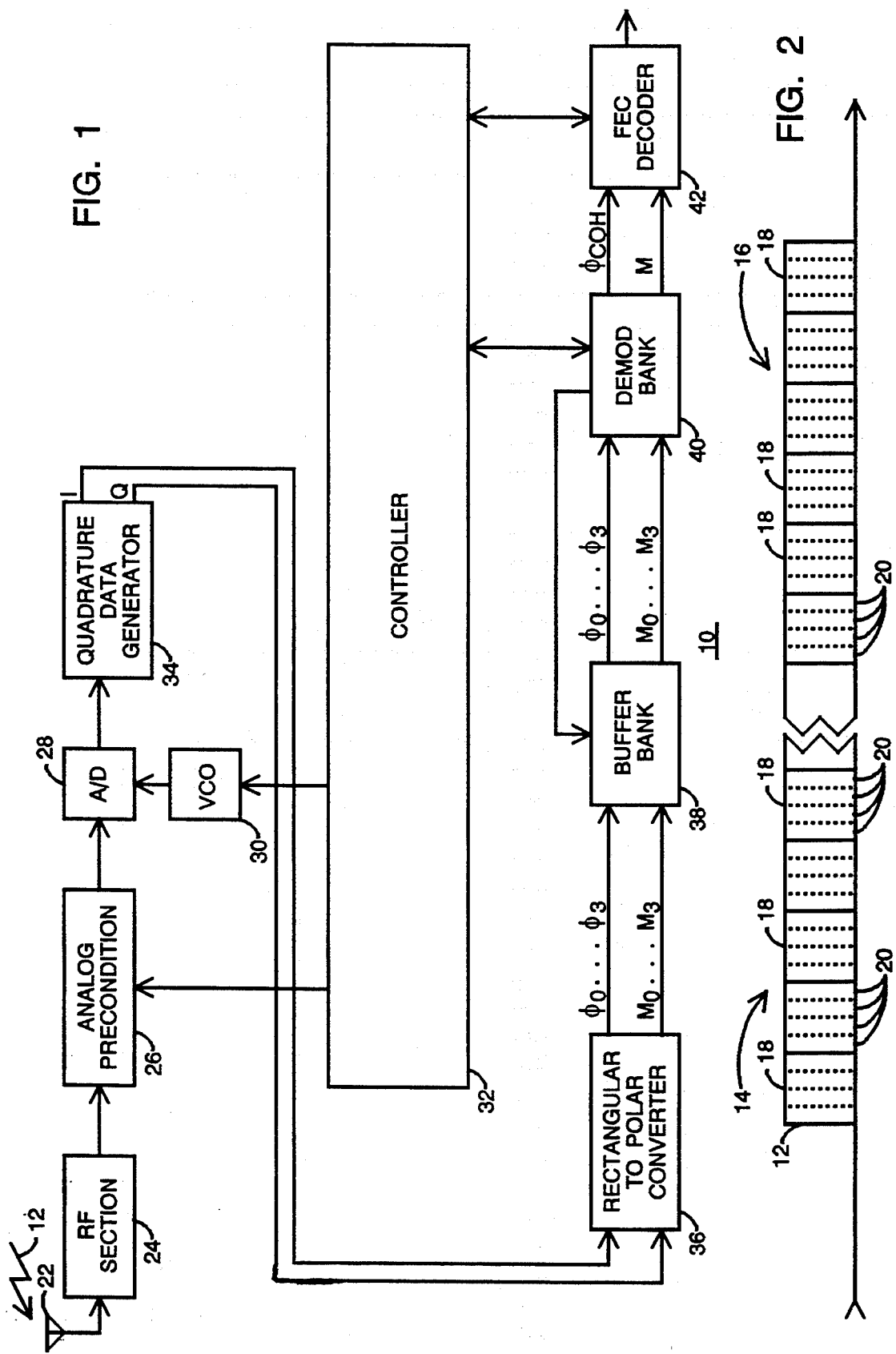

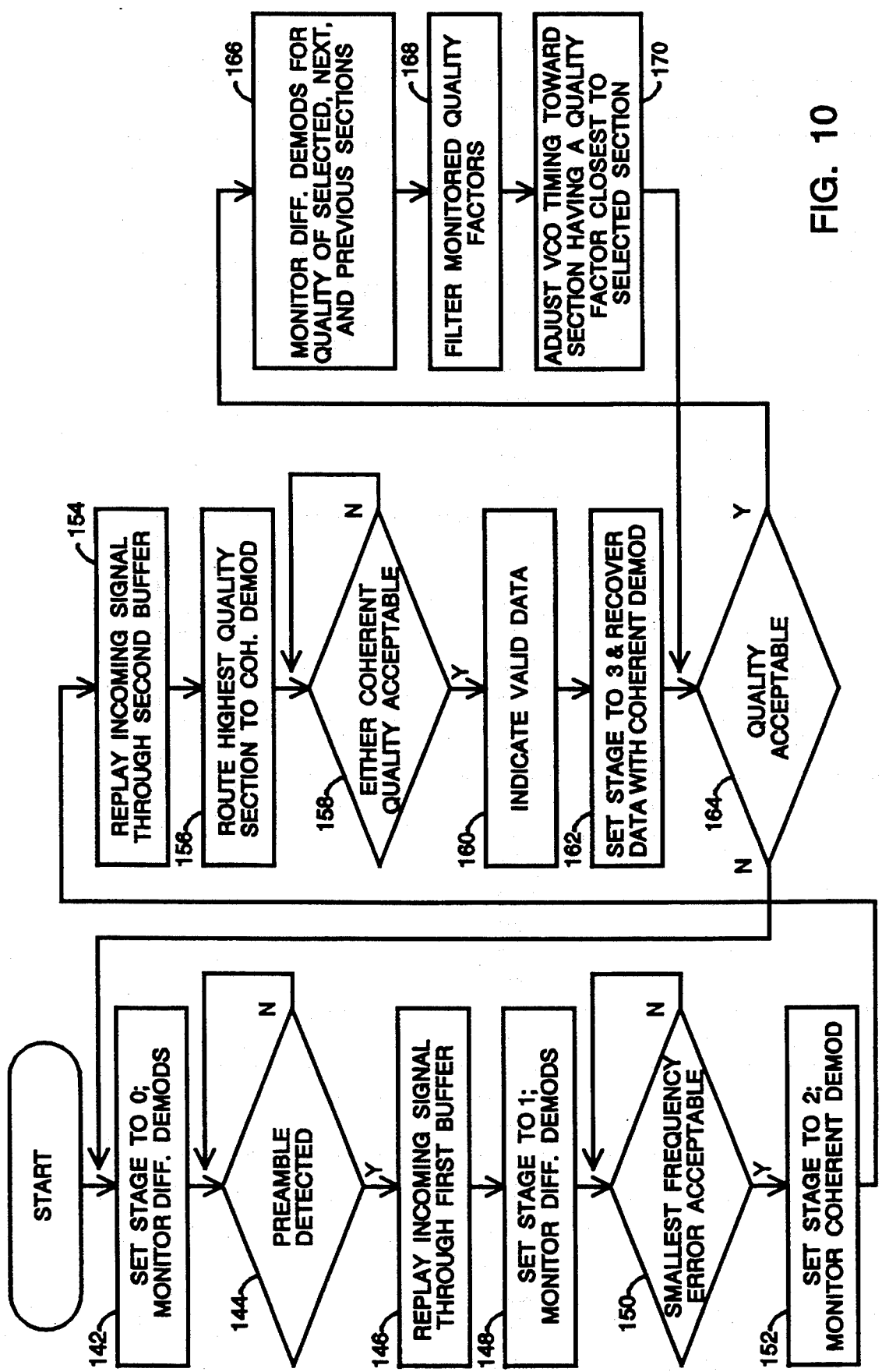

DIFFERENTIAL/COHERENT DIGITAL DEMODULATOR OPERATING AT MULTIPLE SYMBOL POINTS

TECHNICAL FIELD OF THE INVENTION

The present invention relates generally to demodulators. More specifically, the present invention relates to digital demodulators that recover data conveyed by the phase or frequency of an incoming signal through a stream of symbols.

BACKGROUND OF THE INVENTION

Coherent demodulation and differentially coherent demodulation, or simply differential demodulation, are conventional techniques used for retrieving data conveyed by an incoming carrier signal. Between the two techniques, coherent demodulation typically achieves a 1–3 dB improvement in performance. Generally, during each symbol coherent demodulation retrieves data from a carrier signal by comparing a phase relationship between the signal's quadrature components with an absolute phase reference. Noise influences the carrier signal's phase but not the absolute phase reference. Differential demodulation uses the carrier phase from a previous symbol as a reference. Thus, noise influences both the carrier signal's phase and the reference in differential demodulation. This doubling of the noise influence causes differential demodulation to exhibit poorer performance than coherent demodulation. Consequently, digital communication systems benefit from using coherent demodulation.

However, differential demodulators have conventionally been much simpler to implement than coherent demodulators and have conventionally been able to generate valid data quicker than coherent demodulators. One reason for the simplicity of and rapid acquisition by differential demodulators is that coherent demodulators need to generate an absolute phase reference while differential demodulators have no such requirement. In conventional coherent demodulators, the generation of an absolute phase reference requires time and the use of complex components. Extensive carrier phase acquisition time is required because phase locked loops with typically narrow bandwidths must first achieve a locked condition before valid data may be recovered.

This extensive carrier-phase acquisition time is exacerbated by a "hang-up" phenomenon. Hang-up occurs when an initial phase locked loop Oscillator's phase is nearly ½ way between two of the discrete phase states the carrier signal uses to convey data. In hang-up, the phase locked loop has trouble deciding which direction to adjust its oscillator, and carrier phase acquisition may experience unusual and serious delays as a result.

In addition, the phase locked loop components which generate the absolute phase reference have conventionally been the most complex circuits in the entire demodulator. In older implementations of coherent demodulators, the carrier phase acquisition loop included analog components which suffer from well known offset, drift, and noise problems that are not present when digital implementations are constructed. In improved implementations of coherent demodulators, the carrier phase acquisition loop may be implemented using only digital components. Since they do not suffer from the well-known analog implementation problems, they are generally regarded as being more reliable.

However, conventional digital carrier phase acquisition loops usually include numerically controlled oscillators (NCOs) and full complex multipliers to perform full quadrature multiplication. The NCO and full complex multiplier together typically account for well over half of the gates utilized in the entire demodulator. Since power consumption is proportional to the number of gates involved, a considerable amount of power is consumed by the carrier phase acquisition loop. Power consumption is also typically proportional to the speed of operation. Thus, for a given power consumption or dissipation level the excessive complexity of a conventional carrier phase acquisition loop leads to reduced symbol rates. Alternatively, for a fixed symbol rate the excessive complexity of a conventional carrier phase acquisition loop leads to increased power consumption.

Further, conventional demodulators, whether differential or coherent, compute symbol synchronization timing errors by examining quadrature component signals only near their zero-crossing points. Typically, symbol synchronization occurs when sampling points are driven as far from the zero-crossing points as possible. Unfortunately, this technique leads to sub-optimum operation in channels for which a maximum eye opening is not centered between zero-crossing points.

In addition, conventional demodulators yield an undesirably slow symbol acquisition time. The slow acquisition time, for both differential and coherent demodulators, is particularly burdensome in burst communication systems. Such systems include overhead preamble data in each burst to aid symbol and/or carrier phase synchronization. Unfortunately, the preamble reduces the space available for the burst's payload data, and conventional demodulators often require undesirably long preambles for the purpose of acquiring symbol timing.

SUMMARY OF THE INVENTION

Accordingly, it is an advantage of the present invention that an improved digital demodulator and method for demodulating digital data are provided.

Another advantage is that the present invention provides a demodulator which coherently demodulates data using a digital, low power carrier phase acquisition loop.

Another advantage is that the present invention provides a demodulator which coherently demodulates data without experiencing hang-up during carrier phase acquisition.

Another advantage is that the present invention provides a demodulator that simultaneously operates at multiple symbol synchronization points so that it may rapidly achieve symbol synchronization.

Another advantage is that the present invention uses differential demodulation to rapidly achieve symbol synchronization, then uses coherent demodulation for carrier phase acquisition and data recovery.

Another advantage is that the present invention achieves acquisition in successive stages, each of which processes substantially the same preamble portion of an incoming signal so that burst communications may utilize a short preamble.

The above and other advantages of the present invention are carried out in one form by a coherent digital demodulator for recovering data conveyed by an incoming signal in a stream of symbols. The demodulator includes a phase angle generator configured to generate a phase value for each symbol. The phase value defines a phase relationship between in-phase and quadrature components of the incoming signal. A phase error compensator generates an adjusted phase angle for each symbol. The phase error compensator has a first input coupled to the phase angle generator, a second input, and an output. An integrator has an input coupled to the phase error compensator output and an output coupled to the second input of the phase error compensator. The integrator forms a portion of a carrier phase tracking loop.

The above and other advantages of the present invention are carried out in another form by a method for acquiring an incoming signal that conveys data through a stream of symbols. The method calls for detecting first and second frequency errors for a plurality of symbols. The first and second frequency errors are detected for first and second sections of each symbol, respectively. An identification is made concerning whether the frequency errors detected at the first sections are smaller than the frequency errors detected at the second sections. Symbol timing is synchronized in response to this identification.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 shows a block diagram of a demodulator constructed in accordance with a preferred embodiment of the present invention;

FIG. 2 shows a timing format diagram of a communication burst from which the demodulator may recover data;

FIG. 10 shows a flow chart depicting a demodulation process performed by the demodulator.

DETAILED DESCRIPTION OF THE PREFERRED EMBODIMENTS

Figure 3:
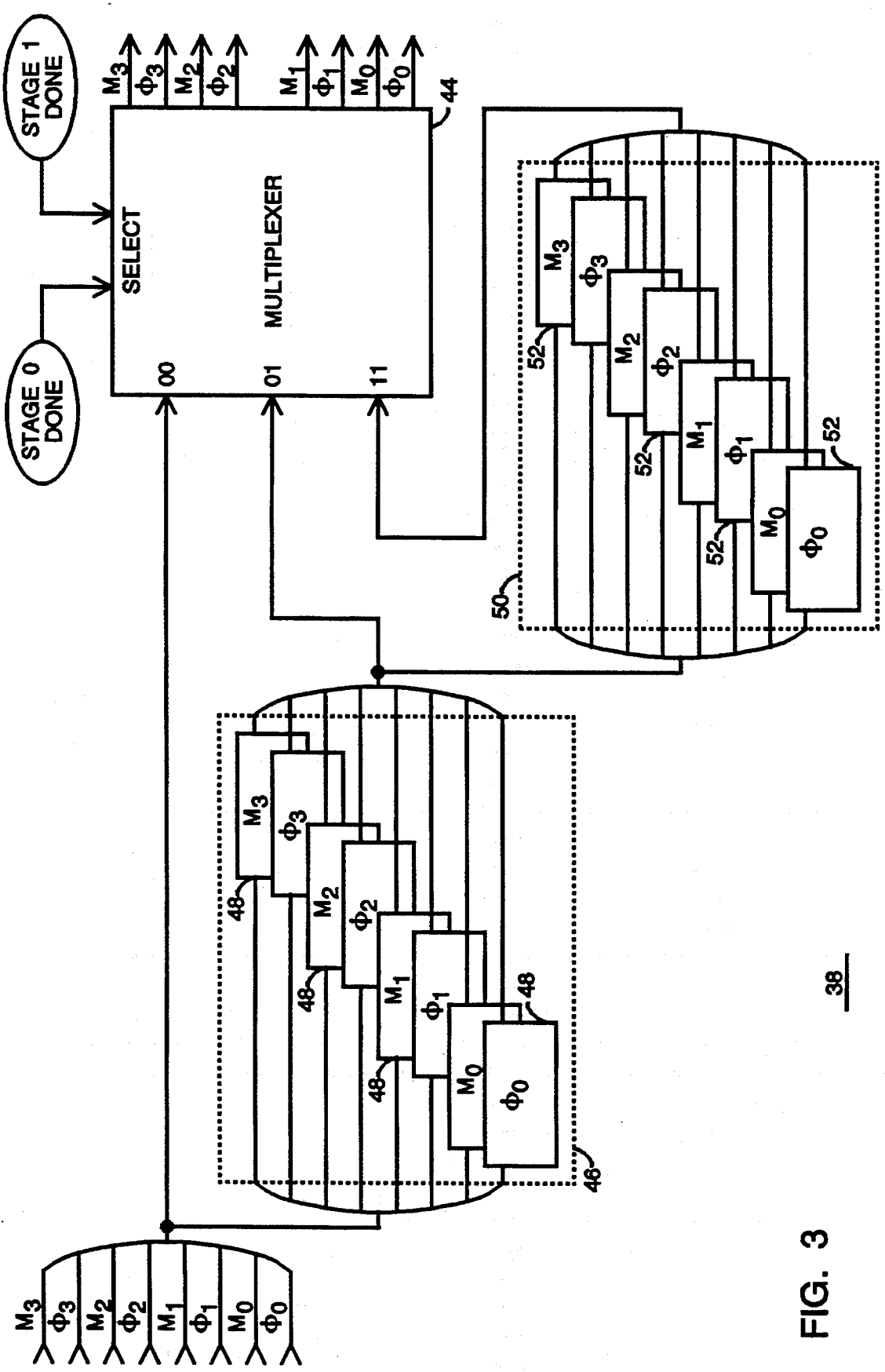
FIG. 3 shows a block diagram of a buffer bank portion of the demodulator.

FIG. 1 shows a block diagram of a digital data demodulator 10. Demodulator 10 recovers digital data from an incoming carrier signal 12. The preferred embodiment of demodulator 10 is configured so that signal 12 may be a burst communication signal, but this is not a requirement.

FIG. 2 shows a timing format diagram of burst communication signal 12. Burst signal 12 includes a preamble 14 at the beginning of burst signal 12 followed by a payload data section 16. In the preferred embodiment, preamble 14 conveys a pattern of alternating 1's and 0's using a binary phase shift-keyed (BPSK) modulation scheme. Payload data section 16 may convey data using any frequency shift-keyed (FSK) modulation scheme, phase shift-keyed (PSK) modulation scheme, and other modulation schemes. In addition, signal 12 is configured to provide a stream of symbol intervals, hereinafter simply referred to as symbols 18. Each symbol 18 in payload data section 16 may convey one or more bits of data in accordance with the modulation order of the modulation scheme selected for signal 12.

For purposes of the present invention, symbols 18 may be viewed as being subdivided into sub-symbol intervals referred to herein as symbol sections 20. The preferred embodiment subdivides symbols 18 into at least three and preferably four distinct symbol sections 20.

Referring back to FIG. 1, signal 12 is received at an antenna 22. Antenna 22 couples to an RF section 24. RF section 24 may include RF filtering, a fixed frequency oscillator, down conversion circuits, and other components conventionally included in RF sections of radio receivers. RF section 24 preferably generates an essentially baseband, analog form of signal 12. An output of RF section 24 couples to an input of an analog precondition circuit 26. Circuit 26 includes anti-aliasing filtering, automatic gain control (AGC), and other circuits commonly used to condition an analog signal for digitizing. An output of precondition circuit 26 couples to a signal input of an analog-to-digital (A/D) converter 28. A/D converter 28 digitizes the baseband form of signal 12 into samples which characterize the amplitude of the baseband form of signal 12 at various instants through symbols 18 (see FIG. 2).

An output of a voltage controlled oscillator (VCO) 30 provides an oscillating signal that controls the timing at which A/D converter 28 samples signal 12. In the preferred embodiment, VCO 30 oscillates at around four times the symbol rate. Thus, A/D converter 28 may provide a sample for each symbol section 20 (see FIG. 2). The oscillation frequency of VCO 30 is controlled by a controller 32 through a digital-to-analog converter (not shown). Thus, controller 32 closes a feedback loop that adjusts the timing at which A/D converter 28 samples signal 12. Controller 32 may be implemented using conventional microprocessor and memory devices.

An output of A/D converter 28 couples to a quadrature data generator 34. Quadrature data generator 34 converts the digital samples of signal 12 into digital rectilinear coordinate characterizations of the signal's I and Q quadrature components. The preferred embodiment uses a well known Hilbert transformation technique to convert sampled carrier data pairs into I and Q data values, but other techniques known to those skilled in the art may be used as well. These I and Q data values express I and Q quadrature components in accordance with a rectilinear coordinate system. In the preferred embodiment, quadrature data generator 34 produces one set of I and Q data values for each symbol section 20, for a total of four such sets per symbol 18.

Quadrature data generator 34 has an I output and a Q output, each of which couples to a rectangular to polar converter 36. Converter 36 generates phase angle ($\phi$) and magnitude (M) data which correspond to phase relationships expressed between the I and Q quadrature values provided by quadrature data generator 34. In the preferred embodiment, a Cordic conversion process is used in making the conversions, but those skilled in the art can adapt other techniques, such as table look-ups and the like, in particular applications. Converter 36 preferably makes one conversion for each symbol section 20 for a total of four polar coordinate representations per symbol 18. Those skilled in the art will appreciate that converter 36 may include four separate "converters" operating in parallel so that each converter need only operate at the symbol rate.

Phase and magnitude outputs of converter 36 couple to phase and magnitude inputs of a buffer bank 38. Generally, buffer bank 38 delays signal 12 as characterized in the phase and magnitude data by selected, varying amounts. By switching in additional amounts of delay, a common portion of signal 12, such as preamble 14 (see FIG. 2), may be replayed over and over. Buffer bank 38 is discussed in more detail below in connection with FIGS. 3 and 10.

Phase and magnitude outputs of buffer bank 38 preferably provide one set of phase and magnitude samples for each symbol section 20 and couple to phase and magnitude inputs of a demod bank 40. A control output of demod bank 40 couples to buffer bank 38 to control the amount of delay applied therein. Demod bank 40 additionally receives control data from and supplies other data to controller 32. Demod bank 40 generally includes a collection of differential and coherent demodulators which are used to detect preamble 14, synchronize to the symbol timing of signal 12, acquire carrier phase, and recover data from signal 12. Demod bank 40 is discussed below in connection with FIGS. 4-10.

Coherent phase ($\phi_{COH}$) and magnitude (M) outputs from demod bank 40 provide one set of phase and magnitude samples for each symbol 18 and couple to inputs of a forward error correction (FEC) decoder 42, such as a Viterbi decoder. Decoder 42 additionally couples to controller 32. Decoder 42 extracts payload data from blocks of data that have been encoded to permit the correction of errors. Thus, an output of decoder 42 provides the data recovered from signal 12. Such decoders are well known to those skilled in the art and need not be discussed further herein. If the extraction of payload data from error correction encoded blocks of data is unnecessary in a particular application, decoder 42 may be omitted.

FIG. 3 shows a block diagram of buffer bank 38. Buffer bank 38 receives four phase values, labeled as $\phi_0$–$\phi_3$, and four magnitude values, labeled as $M_0$–$M_3$ for each symbol 18. Phase value $\phi_0$ and magnitude value $M_0$ characterize signal 12 at the first symbol section 20 of a symbol 18 (see FIG. 2), phase value $\phi_1$ and magnitude value $M_1$ characterize signal 12 at the second symbol section 20 of the symbol 18, and so on. Preferably, buffer bank 38 includes parallel circuits so that it need not operate faster than the symbol rate and so that phase and magnitude values $\phi_0$–$\phi_3$ and $M_0$–$M_3$, respectively, for preceding symbols 18 are provided simultaneously and remain valid for substantially an entire symbol interval.

The phase and magnitude values $\phi_0$–$\phi_3$ and $M_0$–$M_3$, respectively, received by buffer bank 38 are applied directly and without substantial delay to a first data input, labeled "00" in FIG. 3, of a multiplexer 44. They are also applied to an input of a first delay circuit 46 so that they may be recorded therein. Delay circuit 46 desirably includes a separate first in, first out (FIFO) memory buffer 48 for each phase and magnitude value $\phi_0$–$\phi_3$ and $M_0$–$M_3$. Thus, delay circuit 46 delays phase and magnitude values $\phi_0$–$\phi_3$ and $M_0$–$M_3$ by a number of symbols 18 equivalent to the depth of FIFO memory buffers 48. The depth of FIFO memory buffers 48 is not a critical parameter, but is preferably deeper than preamble 14 is long. Each of memory buffers 48 is desirably the same depth so that phase and magnitude values $\phi_0$–$\phi_3$ and $M_0$–$M_3$ remain synchronized with one another. Delay circuit 46 provides delayed phase and magnitude values $\phi_0$–$\phi_3$ and $M_0$–$M_3$ at an output which couples to a second data input, labeled "01" in FIG. 3, of multiplexer 44.

The delayed phase and magnitude values $\phi_0$–$\phi_3$ and $M_0$–$M_3$ also couple to an input of a second delay circuit 50 so that they may be recorded therein. Delay circuit 50 desirably includes equal depth, FIFO memory buffers 52 for each delayed phase and magnitude value $\phi_0$–$\phi_3$ and $M_0$–$M_3$. Delay circuit 50 provides twice delayed phase and magnitude values $\phi_0$–$\phi_3$ and $M_0$–$M_3$ at an output which couples to a third data input, labeled "11" in FIG. 3, of multiplexer 44. Nothing requires the depth of delay circuit 50 to be the same as that of delay circuit 46.

Multiplexer 44 provides phase and magnitude values at an output of buffer bank 38. The phase and magnitude values provided are selected in accordance with "stage 0 done" and "stage 1 done" signals generated by demod bank 40 (see FIG. 1).

Generally, demodulator 10 (see FIG. 1) acquires signal 12 by progressing through a series of operational stages. Stage 0 is the first stage. Demodulator 10 operates in stage 0 to await the arrival of burst communication signal 12. Demodulator 10 completes stage 0 when preamble 14 has been detected, and then proceeds to stage 1. Demodulator 10 completes stage 1 when symbol synchronization, or at least coarse symbol synchronization, has been achieved, and then proceeds to stage 2. Demodulator 10 completes stage 2 when the carrier's phase has been acquired, and then proceeds to stage 3. During stage 3, demodulator 10 recovers data from signal 12 while tracking symbol timing and carrier phase.

The "stage 0 done" and "stage 1 done" signals control multiplexer 44 to produce undelayed phase and magnitude values during stage 0 when preamble 14 is being detected. During stage 1, multiplexer 44 is controlled to replay preamble 14 from delay circuit 46. During stages 2 and 3, multiplexer 44 is controlled to replay preamble 14 again, this time through delay circuits 46 and 50. This replaying of preamble 14 allows signal 12 to use only a short preamble. This short preamble 14 is replayed again and again to detect the preamble, achieve symbol synchronization, and to acquire carrier phase, respectively. Consequently, for a given length burst a short preamble 14 allows a greater amount of payload data 16 to be conveyed, and still permits coherent demodulation. Of course, the replaying of preamble 14 may be desirable even in certain differential demodulation applications where carrier phase is not acquired, and additional delay circuits may be used to further replay a short preamble 14 as needed to sufficiently acquire an incoming signal.

Figure 4:
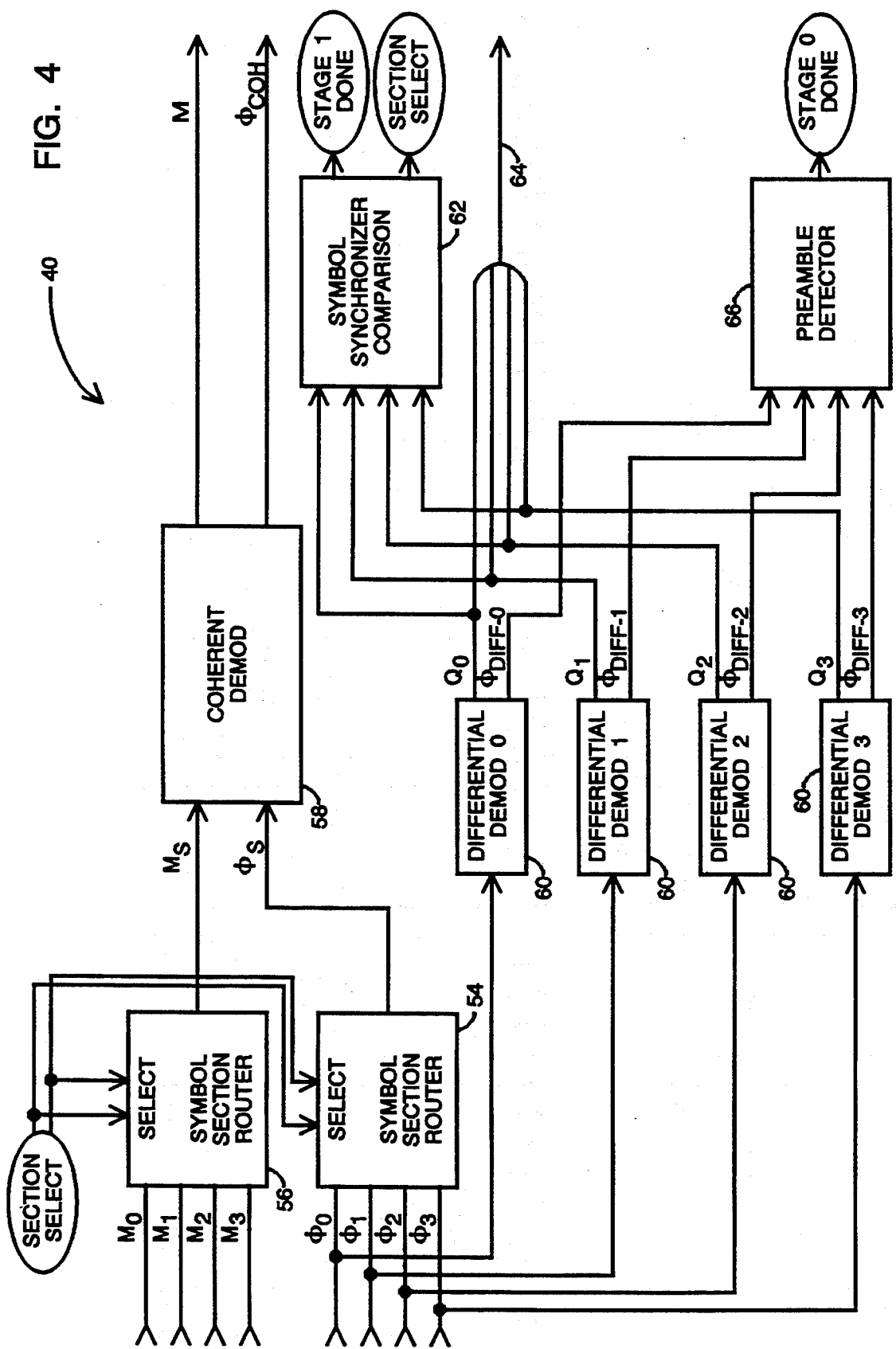
FIG. 4 shows a block diagram of a demod bank portion of the demodulator.

FIG. 4 shows a block diagram of demod bank 40. Demod bank 40 monitors the selectively delayed phase and magnitude values $\phi_0$–$\phi_3$ and $M_0$–$M_3$ produced by buffer bank 38 (see FIGS. 1 and 3). The phase values $\phi_0$–$\phi_3$ are applied to data inputs of a symbol section router 54. The magnitude values $M_0$–$M_3$ are applied to data inputs of a symbol section router 56. Symbol section routers 54 and 56 may be implemented using multiplexers which select one of the four phase and magnitude pairs. The selection is controlled by a "section select" signal, discussed below.

The selected phase/magnitude pair $\phi_S/M_S$ is applied to inputs of a coherent demodulator, or simply demod 58. Coherent demod 58 acquires carrier phase and coherently demodulates incoming signal 12 as characterized by the selected phase/magnitude pair $\phi_S/M_S$. Coherent demod 58 generates an adjusted coherent phase signal $\phi_{COH}$ and an associated coherent magnitude signal M. These signals provide hard and soft decision bits which are routed to FEC decoder 42 (see FIG. 1) for final recovery of the data from signal 12. The coherent phase signal $\phi_{COH}$ indicates the absolute or coherent phase characterized by the selected phase $\phi_S$ and determined relative to an internal coherent phase reference. Coherent demod 58 is discussed in more detail below in connection with FIGS. 8-9

The phase values $\phi_0-\phi_3$ monitored by demod bank 40 are also applied to inputs of differential demods 60. The preferred embodiment includes four differential demods 60, one to differentially demodulate each of the phase values $\phi_0-\phi_3$. Since each of the phase values $\phi_0-\phi_3$ corresponds to a discrete symbol section 20 (see FIG. 2), each differential demod 60 differentially demodulates incoming signal 12 as characterized in different symbol sections 20 throughout the stream of symbols 18. Thus, the four differential demods 60 included in the preferred embodiment differentially demodulate four different interleaved streams of phase values. Differential demodulators 60 are discussed in more detail below in connection with FIG. 5.

Differential demods 60 generate quality factor signals $Q_0-Q_3$ to correspond to the phase value streams $\phi_0-\phi_3$. The quality factor signals generally characterize the frequency error or offset detected in each of the four phase value streams. The outputs which supply the quality factor signals $Q_0-Q_3$ couple to a symbol synchronizer comparison circuit 62 and to controller 32 (see FIG. 1) along a data path 64. Together, differential demods 60 and comparison circuit 62 form a symbol synchronizer which recovers coarse symbol timing from incoming signal 12. Differential demods 60 and controller 32 form a feedback control loop with VCO 30 (see FIG. 1) that achieves fine symbol synchronization tuning and tracking. Comparison circuit 62 generates the "stage 1 done" signal discussed above in connection with FIG. 3 and the section select signals which control symbol section routers 54 and 56. Comparison circuit 62 is discussed in more detail below in connection with FIG. 7.

Differential demods 60 additionally have outputs which generate adjusted differential phase signals $\phi_{DIFF-0}-\phi_{DIFF-3}$. The differential phase describes a frequency characterized by a change in carrier phase over the duration of a symbol 18. These outputs couple to a preamble detector 66. Preamble detector 66 detects the occurrence of preamble 14 and generates the "stage 0 done" signal discussed above in connection with FIG. 3. Preamble detector 66 is discussed in more detail below in connection with FIG. 6.

Figure 5:
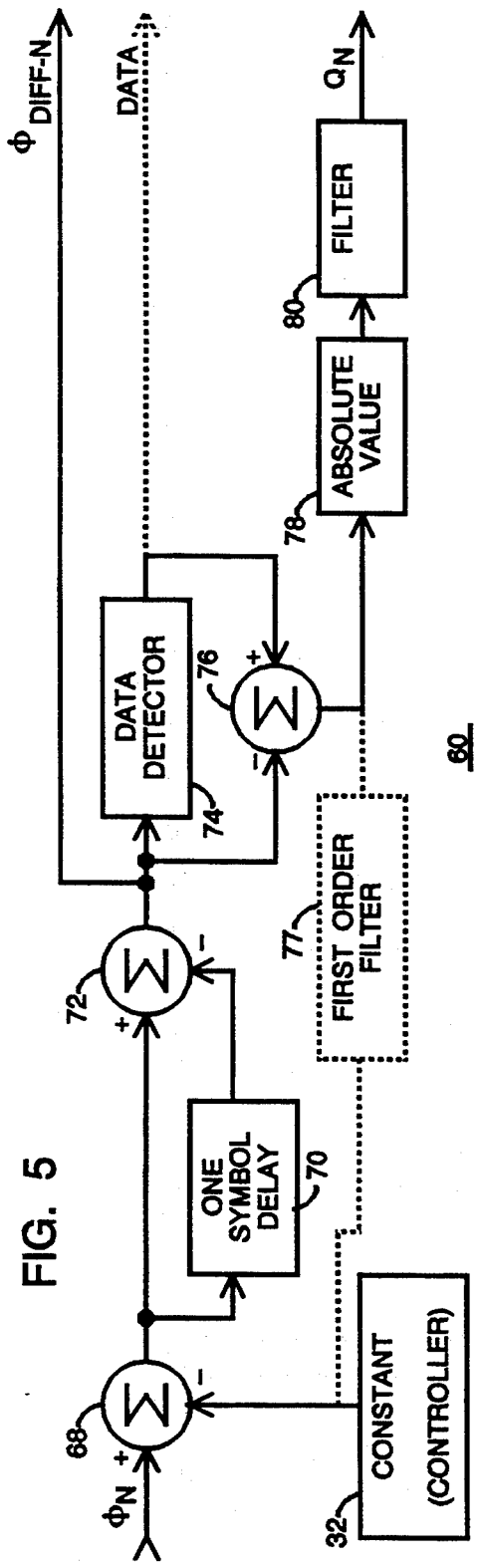
FIG. 5 shows a block diagram of a differential demod portion of the demod bank.

FIG. 5 shows a block diagram of a single differential demod 60. The phase value N' where N represents any one of the numbers 0-3, is applied at a positive input of a phase error compensator 68. Phase error compensator 68 may be implemented using a simple subtraction circuit since phase values are expressed in polar coordinates. A constant provided from controller 32 (see FIG. 1) is fed to a negative input of phase error compensator 68 in the preferred embodiment. An output of phase error compensator 68 couples to an input of a one symbol delay circuit 70 and to a positive input of a subtraction circuit 72. An output of delay circuit 70 couples to a negative input of subtraction circuit 72. An output of subtraction circuit 72 generates the above-discussed adjusted differential phase signal $\phi_{DIFF-N}$.

The adjusted differential phase generated at the output of subtraction circuit 72 is routed to a data detector 74 and a negative input of a frequency error detector 76. Frequency error detector 76 may also be implemented using a simple subtraction circuit since frequency (i.e. differential phase over a symbol interval) values are expressed using polar coordinates. An output of data detector 74 is routed to a positive input of frequency error detector 76, and an output of frequency error detector 76 provides a frequency error term for each symbol 18.

In an alternate embodiment of differential demod 60, the frequency error term from frequency error detector 76 may be filtered in a first order filter 77, shown in dotted lines, and routed back to the negative input of phase error compensator 68. This alternate embodiment forms a frequency locked loop so that the adjusted differential phase signal $\phi_{DIFF-N}$ will be adjusted for frequency errors. However, the preferred embodiment operates essentially open-loop by adjusting for a constant value because it can achieve coarse symbol synchronization more quickly than a useful frequency locked loop can respond.

Data detector 74 may simply perform a conventional roundoff or truncation operation on the adjusted differential phase value to obtain the closest original modulation phase relationship. For example, for BPSK, the roundoff or truncation operation may simply indicate whether adjusted differential phase is closer to 0° or 180°. For QPSK, the roundoff or truncation operation may indicate whether adjusted differential phase is closer to 0°, 90°, 180°, or 270°. While not used in the preferred embodiment, the output from data detector 74 may nevertheless be used in alternate embodiments to provide differential data, as shown by a dotted line in FIG. 5.

Each symbol's frequency error term is routed from frequency error detector 76 to an input of an absolute value block 78, and an output of block 78 is routed to an input of an averaging filter 80. An output of filter 80 provides the quality factor signal $Q_N$. Absolute value block 78 is used to strip polarity information from frequency error terms, leaving only error magnitude information. Filter 80 smooths the error magnitudes by averaging over a number of past symbols 18. Filter 80 may be configured as an adaptive filter in which the number of symbols 18 included in the average starts out small at the beginning of burst signal 12 and increases over time.

Figure 6:
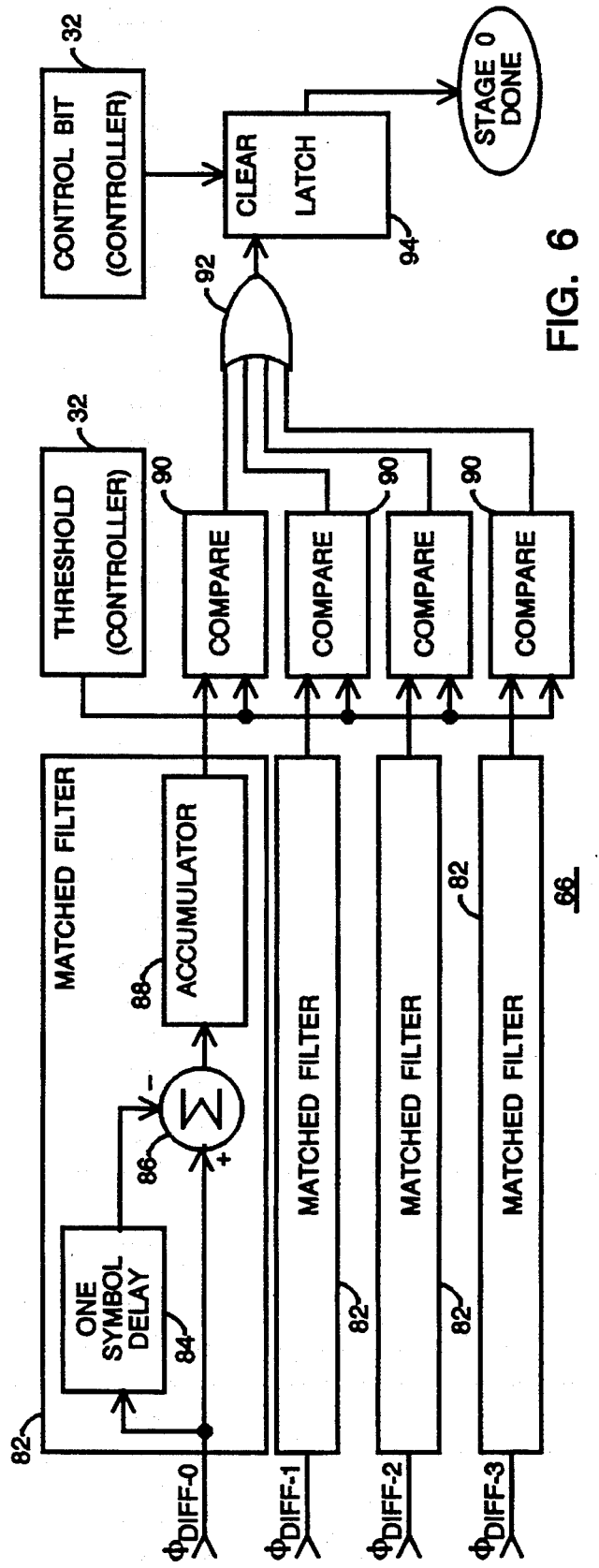
FIG. 6 shows a block diagram of a preamble detector portion of the demod bank.

FIG. 6 shows a block diagram of preamble detector 66. Preamble detector 66 applies each of adjusted differential phase signals $\phi_{DIFF-0}-\phi_{DIFF-3}$ to its own matched filter 82. Matched filters 82 are substantially identical to one another. Each signal is applied to a one symbol delay circuit 84 and to a positive input of a subtraction circuit 86. An output of delay circuit 84 couples to a negative input of subtraction circuit 86. An output of subtraction circuit 86 couples to an input of an accumulator 88, and an output of accumulator 88 provides the output for matched filter 82.

As discussed above, preamble 14 in the preferred embodiment is configured to convey alternating 1's and 0's using BPSK modulation. Accumulator 88 accumulates the symbol-to-symbol phase change produced by this data configuration using modulo addition and outputs a value which corresponds to the accumulated symbol-to-symbol phase change over a duration equivalent to the length of preamble 14. Due to the data configuration of preamble 14, a unique and detectable amount of phase accumulation results.

Each output from matched filters 82 couples to a first input of its own compare circuit 90. A threshold value supplied by controller 32 is applied to second inputs of compare circuits 90, and compare circuits 90 are configured to activate when they detect a matched filter output greater than the threshold. The threshold is set near the amount of phase change which may be experienced from preamble 14 over the duration of preamble 14. Outputs from compare circuits 90 couple through OR logic 92 to a data input of a latch 94. Latch 94 supplies the "stage 0 done" signal discussed above in connection with FIG. 3.

With four sections 20 per symbol 18, the symbol synchronization of one of symbol sections 20 will be no more than $\frac{1}{8}$ of a symbol 18 away from optimum symbol synchronization. Thus, one of symbol sections 20 will be sufficiently synchronized to yield the expected accumulated phase change through its matched filter 82 when the preamble is encountered. When this occurs, the matched filter 82 and compare circuit 90 processing that section 20 will trip the threshold established by controller 32, causing latch 94 to become set. When latch 94 becomes set, demodulator 10 (see FIG. 1) progresses from stage 0 to stage 1. Latch 94 may be reset by a control bit from controller 32. As discussed above, when demodulator 10 (see FIG. 1) progresses from stage 0 to stage 1, the preamble is replayed through symbol buffer bank 38 (see FIG. 1) and demodulator 10 then proceeds to synchronize symbol timing.

Figure 7:
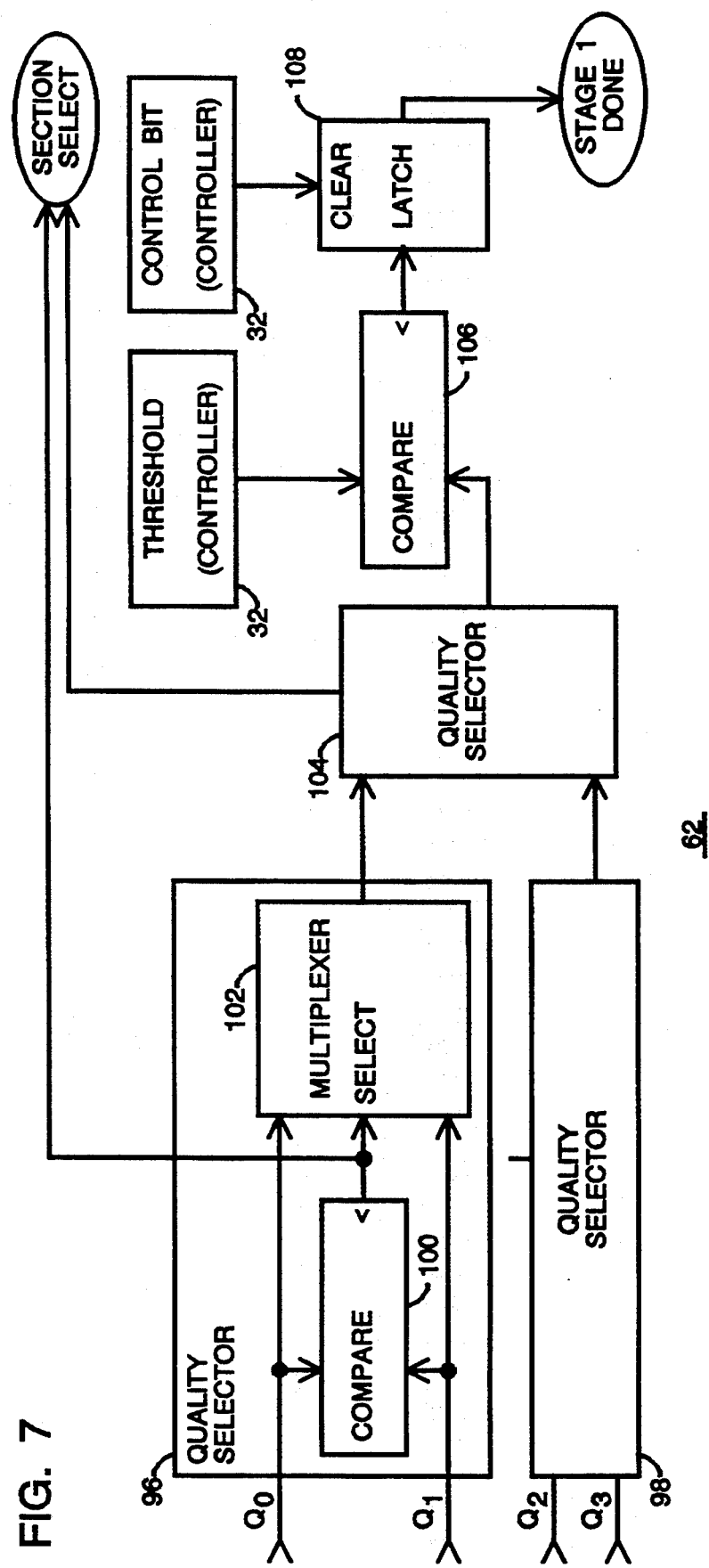
FIG. 7 shows a block diagram of a symbol synchronizer comparison portion of the demod bank.

FIG. 7 shows a block diagram of symbol synchronizer comparison circuit 62. Comparison circuit 62 monitors the quality factor outputs $Q_0$–$Q_3$ generated by differential demods 60 (see FIG. 4). The quality factors generally indicate the average magnitude of frequency error being detected by differential demods 60 for each stream of symbol sections 20. Comparison circuit 62 includes a quality selector 96, which monitors quality factors $Q_0$ and $Q_1$, and a quality selector 98, which monitors quality factors $Q_2$ and $Q_3$. Quality selectors 96 and 98 may be substantially identical to one another. Thus, FIG. 7 shows details only for selector 96.

Quality selectors 96 and 98 include a compare circuit 100, which evaluates the monitored quality factors to determine which indicates the smaller average frequency error magnitude. An output of compare circuit 100 couples to a select input of a multiplexer 102, which has data inputs that are adapted to receive the quality factors monitored by the quality selector 96 or 98. Multiplexer 102 is configured to select the smaller quality factor and generate this smaller quality factor as the output of the quality selector. The select input of multiplexer 102 is also used as an output from quality selector 96 to indicate which quality factor was selected.

The selected quality factors from quality selectors 96 and 98 are applied to data inputs of a quality selector 104, which is configured substantially identical to quality selectors 96 and 98. As a result, the data output of quality selector 104 supplies the one of quality factors $Q_0$–$Q_3$ which exhibits the smallest average magnitude of frequency error. The symbol section 20 which yielded this smallest frequency error provides the best symbol synchronization of the four symbol sections 20. As discussed above, with four of symbol sections 20 per symbol, the symbol timing of this section 20 can be no more than $\frac{1}{8}$ of a symbol 18 away from an optimum symbol synchronization timing. This is sufficiently close to begin producing valid data. The selection identity of quality selector 104 is combined with the selection identity of quality selector 96 to identify this symbol 20 that yields the smallest average magnitude of frequency error. These two identity signals form the section select signal which controls symbol section routers 54 and 56 (see FIG. 4) and may be provided to controller 32 as well.

The selected quality factor output from quality selector 104 couples to a first input of a compare circuit 106, and a second input of compare circuit 106 receives a threshold value supplied by controller 32. Compare circuit 106 determines whether this smallest quality factor is less than the threshold. The threshold is set at a value for which signal quality would be deemed acceptable. An output of compare circuit 106 couples to a latch 108. When the symbol section 20 yielding the smallest quality factor yields an acceptably small average frequency magnitude error, compare circuit 106 causes latch 108 to become set. At this point, coarse symbol synchronization has been achieved, and demodulator 10 (see FIG. 1) may progress to stage 2 to begin carrier phase acquisition. An output of latch 108 provides the "stage 1 done" signal which was discussed above in connection with FIG. 3. A control bit from controller 32 may clear latch 108.

Referring back to FIG. 4, the section select signals from symbol synchronizer comparison circuit 62 cause the phase and magnitude values generated by the symbol section 20 that yields the smallest average magnitude frequency error to be routed to coherent demod 58. These phase and magnitude values are labeled $\phi_S$ and $M_S$, respectively.

Figure 8:
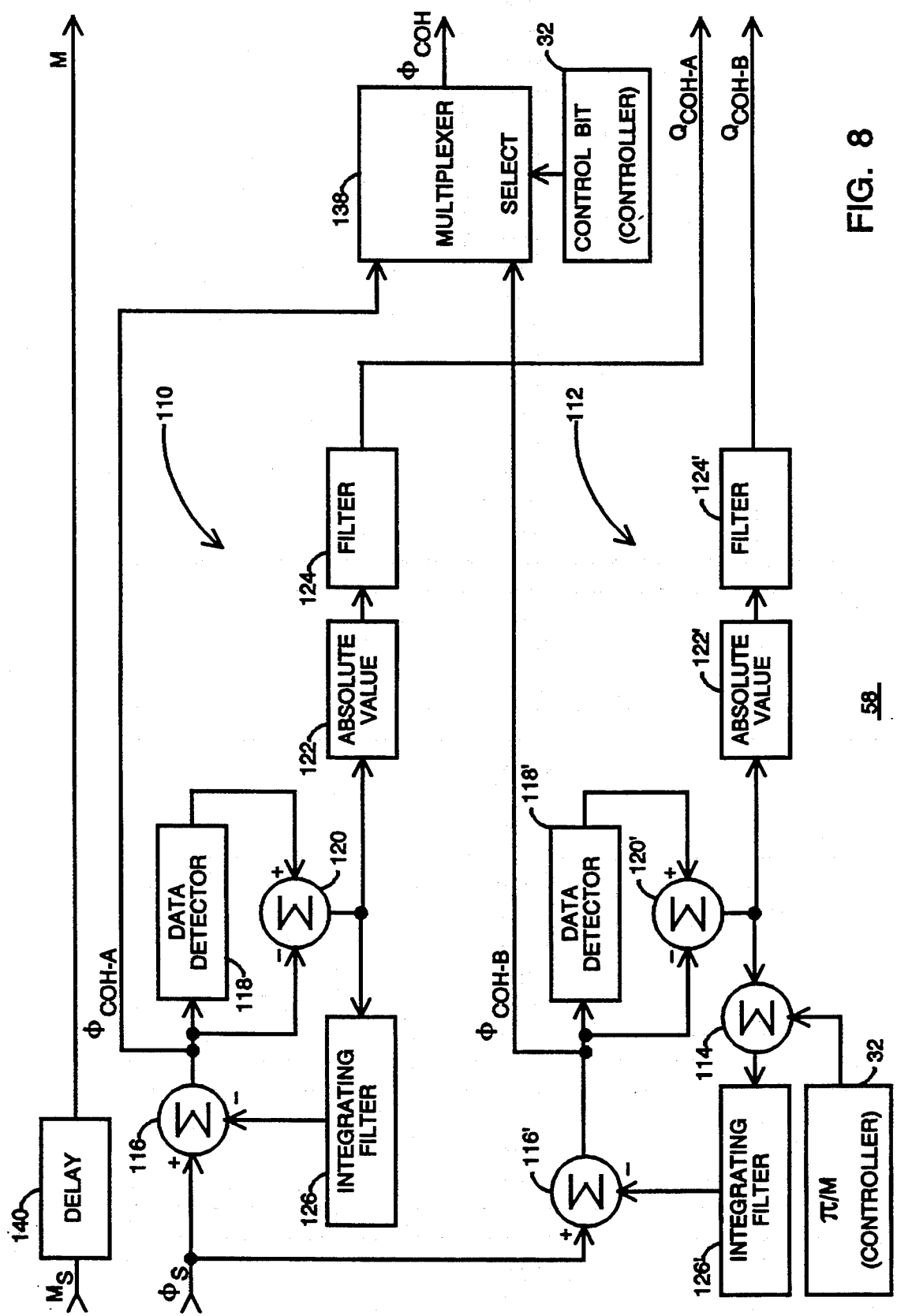
FIG. 8 shows a block diagram of a coherent demod portion of the demod bank.

FIG. 8 shows a block diagram of coherent demod 58. Coherent demod 58 includes first and second demod sections 110 and 112. Except for the inclusion of a phase error offset generator 114 included in second demod section 112, sections 110 and 112 may be substantially identical. The phase value $\phi_S$ is applied at positive inputs of phase error compensators 116 and 116'. Phase error compensators 116 and 116' may be implemented using simple subtraction circuits since phase values are expressed in polar coordinates. Phase error compensators 116 and 116' output respective adjusted coherent phase values, labeled $\phi_{COH-A}$ and $\phi_{COH-B}$ in FIG. 8.

The adjusted coherent phase values generated at the outputs of subtraction circuits 116 and 116' are routed to respective data detectors 118 and 118' and to negative inputs of respective phase error detectors 120 and 120'. Phase error detectors 120 and 120' may also be implemented using simple subtraction circuits since phase values are expressed using polar coordinates. Outputs of data detectors 118 and 118' are routed to respective positive inputs of phase error detectors 120 and 120', and respective outputs of phase error detectors 120 and 120' provide phase error terms for each symbol 18.

The outputs of phase error detectors 120 and 120' couple to inputs of absolute value blocks 122 and 122', respectively, and outputs of absolute value blocks 122 and 122' couple to inputs of averaging filters 124 and 124', respectively. Absolute value blocks 122 and 122' and filters 124 and 124' operate as discussed above in connection with absolute value block 78 and filter 80 in FIG. 5. Thus, outputs of filters 124 and 124' generate quality factors $Q_{COH-A}$ and $Q_{COH-B}$, respectively, which may be routed to controller 32 (see FIG. 1).

The output of phase error detector 120 also couples to an input of an integrating filter 126, and an output of integrating filter 126 couples to a negative input of phase error compensator 116. The output of phase error detector 120' also couples to a first input of phase error offset generator 114, and a second input of phase error offset generator 114 receives a constant value provided by controller 32. Phase error offset generator 114 provides a small amount of phase rotation to the phase error detected by phase error detector 120'. Since phase values are expressed in polar coordinates, this phase rotation may be accomplished with a simple addition circuit. An output of phase error offset generator 114 couples to an input of an integrating filter 126', and an output of integrating filter 126' couples to a negative input of phase error compensator 116'.

Data detectors 118 and 118' operate similarly to data detector 74 (see FIG. 5), and phase error detectors 120 and 120' operate similarly to frequency error detector 76 (see FIG. 5). However, data detectors 118 and 118' and phase error detectors 120 and 120' differ in that they operate on phase rather than frequency (i.e. phase change over a symbol interval).

Integrating filters 126 and 126' form an adaptive frequency reference which closes a phase locked loop at phase error compensators 116 and 116'. However, the frequency reference provided by integrating filters 126 and 126' does not generate sinusoid oscillating signals to achieve phase coherence. Sinusoid amplitudes of an oscillating signal are not required since the phase locked loops are operated in the phase domain using only polar coordinates. Accordingly, integrating filters 126 and 126' may be implemented using simple, low power components rather than more complex and high powered numerically controlled oscillators.

Figure 9:
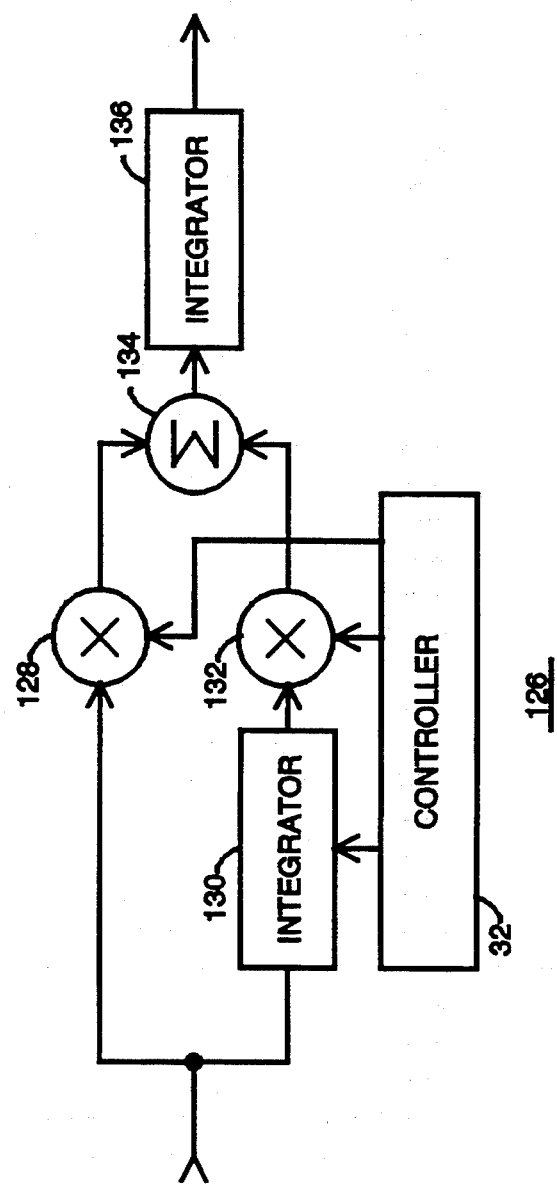
FIG. 9 shows a block diagram of an integrating filter portion of the coherent demod.

FIG. 9 shows a block diagram of integrating filter 126, which is preferably substantially identical to integrating filter 126'. Filter 126 may be viewed as a second order loop filter with perfect integration and phase lead compensation. Filter 126 applies the phase error values to inputs of a scaling circuit 128 and an integrator 130. An output of integrator 130 couples to an input of a scaling circuit 132. Constant values obtained from controller 32 are applied to inputs of integrator 130, scaling circuit 128, and scaling circuit 132. These constant values serve as scaling factors for scaling circuits 128 and 132 and as initial frequency offsets for integrator 130. Outputs of scaling circuits 128 and 132 couple to inputs of a combining circuit 134, such as an adder. An output of combining circuit 134 couples to an input of an integrator 136, and an output of integrator 136 provides filtered phase values which correspond to the adaptive frequency reference which integrating filter 126 forms.

Scaling circuit 128 provides a phase offset value generated directly from the phase error. Integrator 130 and scaling circuit 132 provide a frequency offset generated by integrating the phase error. These phase and frequency offsets are combined in combining circuit 134. When the phase locked loop stabilizes, the phase and frequency offsets settle out to a relatively stable value. Integrator 136 integrates this potentially stable value over time so that its output continually ramps up or down in response to stable frequency and phase offsets. Integrator 136 uses modulo arithmetic so that it simulates oscillation. For example, ramping up from 359° produces an output of 0°. Thus, the output of integrator 136 produces the phase angles which correspond to amplitudes traced by a sinusoid wave. The actual sinusoid wave is not produced.

Referring back to FIG. 8, first and second demod sections 110 and 112 differ in the inclusion of phase error offset generator 114 in second demod section 112. This feature allows coherent demod 58 to acquire the carrier phase quickly, without experiencing hang-up. Hang-up occurs when a phase locked loop's initial phase reference is nearly ½ way between two of the discrete phase states that incoming signal 12 uses to convey data. In hang-up, the phase locked loop has trouble deciding which direction to adjust its phase reference, and phase lock is delayed as a result.

The phase locked loops of sections 110 and 112 use different initial phase reference values. The initial phase reference values differ by the angle represented in the constant applied from controller 32 to phase error offset generator 114. In the preferred embodiment, this initial reference phase difference equals $\pi/M$, where M is the modulation order. The value M equals 2 for BPSK, 4 for QPSK, and so on. Thus, when a phase locked loop from one of sections 110 or 112 is at its hang-up point and will experience its slowest carrier phase acquisition time, the other of sections 110 or 112 will be at the precise point needed to achieve instant carrier phase acquisition, and vice versa. Eventually, both of sections 110 and 112 will acquire the carrier phase and achieve lock, regardless of the different initial reference phase offsets. However, both need not achieve lock at the same time.

The adjusted coherent phase values generated by phase error compensators 116 and 116' are applied to data inputs of a multiplexer 138. A select input of multiplexer 138 receives a control bit from controller 32. This control bit selects one or the other of the adjusted coherent phase values. The selected signal, labeled $\phi_{COH}$ in FIG. 8, is provided as an output from coherent demod 58. Controller 32 monitors quality factors $Q_{COH-A}$ and $Q_{COH-B}$ to determine which one of sections 110 and 112 is the first to generate an acceptable quality factor. When this occurs, the select bit is set accordingly, the adjusted coherent phase values from the selected phase error compensator 116 or 116' are provided at the output of coherent demod 58 for the recovery of data, the carrier phase has been acquired, and demodulator 10 may progress to stage 3. Carrier phase acquisition is not slowed by hang-up because only one of sections 110 or 112 can experience hang-up during an acquisition. If one of sections 110 or 112 experiences hang-up, the other section will quickly acquire carrier phase and be selected.

The selected coherent phase value $\phi_{COH}$ provided at the output of coherent demod 58 is passed to FEC decoder 42 (see FIG. 1). This value characterizes the data conveyed by incoming signal 12 in hard decision bits and additionally includes soft decision bits which decoder 42 uses in error detection and correction. In an alternate embodiment, outputs from data detectors 118 and 118' are routed to multiplexer 138 (not shown) so that decoder 42 may be omitted.

The magnitude value $M_S$ that is applied to the input of coherent demod 58 is delayed in a delay circuit 140 and then passed along to FEC decoder 42. The delay in circuit 140 matches any pipelining delay introduced by sections 110 and 12 in generating the output signal $\phi_{COH}$.

FIG. 10 shows a flow chart which further depicts the process performed by demodulator 10 in acquiring and recovering data from incoming signal 12 and also depicts the operation of demodulator 10 in its stage 3. The process may be viewed as starting at a task 142, where controller 32 has decided that signal 12 is not present. Controller 32 may monitor the various differential and/or coherent quality factors discussed above and conclude that signal 12 is not present when only unacceptable quality is indicated.

In task 142, controller 32 sets demodulator 10 to stage 0 by clearing latches 94 (see FIG. 6) and 108 (see FIG. 7). In stage 0, preamble detector 66 (see FIG. 4) monitors differential demods 60 (see FIG. 4). As indicated in a task 144, demodulator 10 remains in stage 0 until preamble 14 is detected. In addition, during task 144 samples of incoming signal 12 are being recorded in delay circuits 46 and 50 (see FIG. 3).

When preamble detector 66 detects preamble 14, incoming signal 12 is replayed from the FIFO memory buffers 48 (see FIG. 3) of delay circuit 46, as indicated in a task 146. In addition, the stage is set to 1, as indicated in a task 148. During stage 1, differential demods 60 monitor the replayed preamble, and symbol synchronizer comparison circuit 62 (see FIGS. 4 and 7) monitors the quality factors produced by differential demods 60.

Symbol synchronizer comparison circuit 62 then performs a query task 150, which determines whether the smallest average magnitude frequency error is acceptably small. The process remains at task 150 until an acceptably small frequency error is detected. However, controller 32 may implement a time out procedure (not shown) to return demodulator 10 to stage 0 if no acceptably small frequency error is discovered within a predetermined period of time. When task 150 identifies an acceptably small frequency error, a task 152 sets the stage to 2, and monitoring shifts to coherent demod 58 (see FIGS. 4 and 8). The preamble is again replayed, but this time through delay circuits 46 and 50, as indicated in a task 154. The phase and magnitude samples from the symbol section 20 yielding the highest quality, or smallest frequency error, are routed to coherent demod 58, as indicated in a task 156.

Controller 32 performs a task 158 to determine whether the average magnitude phase errors from either of sections 110 or 112 (see FIG. 8) of coherent demod 58 indicate an acceptable quality. Demodulator 10 remains in stage 2 at task 158 until an acceptable quality factor is produced. However, controller 32 may implement a time out procedure (not shown) to return demodulator 10 to stage 0 if no acceptably small phase error quality is discovered within a predetermined period of time.

When acceptable phase error quality is discovered, controller 32 controls multiplexer 138 (see FIG. 8) to select the section 110 or 112 (see FIG. 8) that first produced the acceptable phase error quality. At this point, the carrier phase has been acquired. Controller 32 may indicate the presence of valid data by enabling FEC decoder 42 (see FIG. 1), as indicated in a task 160. As indicated in a task 162, demodulator 10 proceeds to stage 3 and then recovers data using the phase and magnitude produced by coherent demod 58. In the preferred embodiment, stage 3 uses the same amount of delay in the incoming signal as was used in stage 2, and the settings at buffer bank 38 are not altered.

As indicated at a query task 164, controller 32 may continue to monitor coherent and/or differential quality factors to determine whether acceptably small phase and frequency errors are being detected. If unacceptable data quality is discovered, demodulator 10 may return to task 142 to operate in stage 0.

So long as acceptably small phase and frequency errors are being detected, controller 32 desirably continues to monitor the quality factors produced by differential demods 60, as indicated in a task 166. In particular, controller 32 monitors the average magnitude frequency errors produced from processing the symbol section 20 having the smallest frequency error along with the preceding and following symbol sections 20. As indicated in a task 168, controller 32 may apply additional filtering to these quality factors. In response to these three quality factors, controller 32 adjusts the timing of VCO 30 (see FIG. 1), as indicated in a task 170. In particular, VCO 30 is adjusted in the direction (i.e. faster or slower) of the symbol section 20 that yields the next smallest average magnitude frequency error. This closes a feedback loop that causes symbol sections 20 to migrate small durations within symbols 18 while seeking the optimum symbol synchronization. Thus, task 170 performs fine symbol synchronization and symbol timing tracking for demodulator 10. After task 170, demodulator 10 returns to task 164 to continue monitoring phase and frequency error magnitudes.

In an alternative embodiment, tasks 166, 168, and 170 are omitted and fine symbol synchronization and symbol tracking operations are not performed. This alternate embodiment may be performed when burst communication signal 12 is so short in length that meaningful symbol timing tracking could not occur within the duration of the burst.

In summary, the present invention provides an improved digital demodulator and method for demodulating digital data. The present invention provides a demodulator which coherently demodulates data using a digital low power carrier phase acquisition loop. The low power results from operating a phase locked loop using only polar coordinates. This eliminates a need for a high powered voltage or numerically controlled oscillator and a full complex multiplier. The savings in power and components from operating in the phase domain allow multiple differential and coherent demodulators to be implemented for parallel operations with roughly the same or less complexity than that required to implement a single coherent demodulator using rectangular coordinates.

The present invention provides a demodulator which coherently demodulates data without experiencing carrier phase acquisition delays caused by hang-up. Two adaptive frequency references operate in parallel phase locked loops having different initial phase offsets. Hang-up is eliminated because the initial phase offset prevents both phase locked loops from experiencing hang-up at the same time.

The present invention provides a demodulator that simultaneously operates at multiple symbol synchronization points so that it may rapidly achieve symbol synchronization. With simultaneous processing of multiple symbol sections, one symbol section will always be sufficiently close to optimum symbol timing to provide useful data. This one symbol section may simply be identified in an open loop manner without waiting for a feedback loop to acquire symbol timing.

The present invention uses differential demodulation to rapidly achieve symbol synchronization, then uses coherent demodulation for carrier phase acquisition and data recovery. Thus, symbol timing functions and phase acquisition functions are not opposing one another to the detriment of both.

The present invention achieves acquisition in successive stages, each of which processes the preamble portion of an incoming signal so that burst communications may utilize a short preamble. Various stages process the same preamble portion of the incoming signal by recording the incoming signal in a delay circuit and then replaying the incoming signal as needed for the various stages.

The present invention has been described above with reference to preferred embodiments. However, those skilled in the art will recognize that changes and modifications may be made in these preferred embodiments without departing from the scope of the present invention. For example, multiple symbol sections are processed in parallel in the above-discussed preferred embodiment to reduce the amount of processing which must be accomplished at speeds in excess of the symbol rate and to reduce power consumption. However, other applications may benefit from sequentially processing multiple symbol sections. In other applications, such as those in which a continuous signal rather than burst signal is being received, the buffer bank and stage 0 operation may be omitted. These and other changes and modifications which are obvious to those skilled in the art are intended to be included within the scope of the present invention.

What is claimed is:

1. A coherent digital demodulator for recovering data conveyed by an incoming signal in a stream of symbols, said demodulator comprising:
    a phase angle generator configured to generate a phase value for each symbol, said phase value defining a phase relationship between in-phase and quadrature components of said incoming signal;
    a phase error compensator for generating an adjusted phase angle for each symbol, said phase error compensator having a first input coupled to said phase angle generator, a second input, and an output; and
    an integrator, having an input coupled to said phase error compensator output and having an output coupled to said second input of said phase error compensator, for forming a carrier phase tracking loop.

2. A coherent digital demodulator as claimed in claim 1 additionally comprising:
    a frequency offset detector having an input coupled to said phase error compensator output and having an output;
    a phase offset detector having an input coupled to said phase error compensator and having an output; and
    combining means, having a first input coupled to said frequency offset detector, a second input coupled to said phase offset detector, and an output coupled to said integrator input.

3. A coherent digital demodulator as claimed in claim 1 additionally comprising:
    a data detector having an input coupled to said phase error compensator output and having an output; and
    a phase error detector having a first input coupled to said phase error compensator, a second input coupled to said data detector output, and an output coupled to said input of said integrator.

4. A coherent digital demodulator as claimed in claim 1 additionally comprising:
    an alternate phase error compensator for generating an alternate adjusted phase angle for each symbol, said alternate phase error compensator having a first input coupled to said phase angle generator, a second input, and an output;
    a phase error offset generator having an input coupled to said alternate phase error compensator and having an output; and
    an alternate integrator, having an input coupled to said phase error offset generator output and having an output coupled to said second input of said alternate phase error compensator, for forming an offset carrier phase tracking loop.

5. A coherent digital demodulator as claimed in claim 4 additionally comprising means, coupled to said integrator and to said alternate integrator, for selecting one of said phase error compensator and said alternate phase error compensator to recover said data.

6. A coherent digital demodulator as claimed in claim 1 additionally comprising a symbol synchronizer, coupled to said phase angle generator, for recovering symbol timing from said incoming signal.

7. A coherent digital demodulator as claimed in claim 6 wherein said phase angle generator generates a plurality of phase values for each symbol, each of said plurality of phase values being generated to characterize said incoming signal at a distinct symbol section thereof, and said symbol synchronizer comprises:
    a first differential demodulator having an input coupled to said phase angle generator, having an output, and being configured to generate first frequency errors detected at first sections of said symbols;
    a second differential demodulator having an input coupled to said phase angle generator, having an output, and being configured to generate second frequency errors detected at second sections of said symbols; and
    comparison means, coupled to said outputs of said first and second differential demodulators, for identifying whether frequency errors detected at said first sections are smaller than frequency errors detected at said second sections.

8. A coherent digital demodulator as claimed in claim 7 wherein:
    said symbol synchronizer additionally comprises a third differential demodulator having an input coupled to said phase angle generator, having an output, and being configured to generate third frequency errors detected at third sections of said symbols;
    said comparison means couples to said output of said third differential demodulator and identifies which of said first, second, and third sections yields the smallest frequency errors; and
    said coherent digital demodulator additionally comprises means, coupled to said first, second, and third differential demodulators, for reducing the smallest of said frequency errors detected at said first, second, and third sections.

9. A coherent digital demodulator as claimed in claim 8 wherein said reducing means is configured to adjust timing for the one of said first, second, and third sections that yields the smallest frequency error toward the one of said other sections which yields the next smallest frequency error.

10. A coherent digital demodulator as claimed in claim 7 additionally comprising a symbol section router, having a selection input coupled to said comparison means, data inputs coupled to said phase angle generator, and an output coupled to said phase error compensator, said symbol section router being configured to route phase values associated with the one of said sections having the smallest of said frequency errors to said phase error compensator.

11. A coherent digital demodulator as claimed in claim 1 additionally comprising:
   a delay circuit coupled between said phase angle generator and said phase error compensator; and
   a preamble detector coupled to said phase angle generator.

12. A coherent digital demodulator as claimed in claim 1 wherein said phase error compensator is a subtraction circuit.

13. A coherent digital demodulator for rapidly acquiring carrier phase synchronization comprising:
   a first phase error compensator having a first input adapted to receive an incoming signal, having a second input, and having an output;
   a second phase error compensator having a first input adapted to receive said incoming signal, having a second input, and having an output;
   a first phase error detector having an input coupled to said first phase error compensator output and having an output coupled to said second input of said first phase error compensator;
   a second phase error detector having an input coupled to said second phase error compensator output and having an output; and
   a phase error offset generator having an input coupled to said second phase error detector output and having an output coupled to said second input of said second phase error compensator.

14. A coherent digital demodulator as claimed in claim 13 wherein said incoming signal conveys data in a stream of symbols, and said demodulator additionally comprises:
   a phase angle generator coupled to said first inputs of said first and second phase error compensators, said phase angle generator being configured to translate said incoming signal into a phase angle value for each symbol, said phase angle value defining a phase relationship between in-phase and quadrature components of said incoming signal;
   a first integrator, coupled between said first phase error detector and said second input of said first phase error compensator; and
   a second integrator, coupled between said second phase error detector and said second input of said second phase error compensator.

15. A coherent digital demodulator as claimed in claim 14 additionally comprising:
   a frequency offset detector having an input coupled to said first phase error detector output and having an output;
   a phase offset detector having an input coupled to said first phase error detector output and having an output; and
   combining means, having a first input coupled to said frequency offset detector, a second input coupled to said phase offset detector, and an output coupled to said first integrator.

16. A coherent digital demodulator as claimed in claim 13 wherein said incoming signal conveys data in a stream of symbols, and said demodulator additionally comprises means, coupled to said first and second phase error compensators, for selecting one of said first and second phase error compensators to recover said data.

17. A coherent digital demodulator as claimed in claim 13 wherein said incoming signal conveys data in a stream of symbols, and said coherent digital demodulator additionally comprising a symbol synchronizer, coupled to said first inputs of said first and second phase error compensators, for recovering symbol timing from said incoming signal.

18. A coherent digital demodulator as claimed in claim 17 additionally comprising a phase angle generator coupled to said first inputs of said first and second phase error compensators, said phase angle generator being configured to translate said incoming signal into a plurality of phase values for each symbol, said phase values characterizing a phase relationship between in-phase and quadrature components of said incoming signal at a plurality of distinct symbol sections thereof, and wherein said symbol synchronizer comprises:
   a first differential demodulator having an input coupled to said phase angle generator, having an output, and being configured to generate first frequency errors detected at first sections of said symbols;
   a second differential demodulator having an input coupled to said phase angle generator, having an output, and being configured to generate second frequency errors detected at second sections of said symbols; and
   comparison means, coupled to said outputs of said first and second differential demodulators, for identifying whether frequency errors detected at said first sections are smaller than frequency errors detected at said second sections.

19. A coherent digital demodulator as claimed in claim 18 additionally comprising a symbol section router having a selection input coupled to said comparison means, data inputs coupled to said phase angle generator, and an output coupled to said first inputs of said first and second phase error compensators, said symbol section router being configured to route phase values associated with the one of said sections yielding the smaller of said frequency errors to said first and second phase error compensators.

20. A coherent digital demodulator as claimed in claim 13 wherein said incoming signal conveys data in a stream of symbols, and said demodulator additionally comprises:
   a digitizer configured to translate said incoming signal into samples which, for each symbol, characterize in-phase and quadrature components of said incoming signal;
   a preamble detector coupled to said digitizer; and
   a delay circuit coupled between said digitizer and said first inputs of said first and second phase error compensators.

21. A demodulator for demodulating a burst communication signal having a preamble portion followed by conveyed data, said demodulator comprising:
   a digitizer for characterizing a parameter of said communication signal which is manipulated to convey data, said digitizer having an output;

a delay circuit having an input coupled to said digitizer output and having an output;

a preamble detector coupled to said digitizer output; and a symbol synchronizer coupled to said delay circuit output.

22. A demodulator as claimed in claim 21 wherein said delay circuit is configured as a first in, first out (FIFO) memory.

23. A demodulator as claimed in claim 21 wherein said delay circuit is a memory capable of recording at least said preamble portion of said burst communication signal.

24. A demodulator as claimed in claim 21 wherein said delay circuit is a first delay circuit, and said demodulator additionally comprises:

a second delay circuit having an input coupled to said first delay circuit output and having an output; and a carrier phase acquisition circuit coupled to said second delay circuit output.

25. A demodulator as claimed in claim 24 wherein said signal conveys data in a stream of symbols, said digitizer is a phase angle generator configured to generate a phase value for each symbol, said phase value defining a phase relationship between in-phase and quadrature components of said incoming signal, and said carrier phase acquisition circuit comprises:

a phase error compensator for generating an adjusted phase angle for each symbol, said phase error compensator having a first input coupled to said second delay circuit output, a second input, and an output; and an integrator, having an input coupled to said-phase error compensator output and having an output coupled to said second input of said phase error compensator, for forming a carrier phase tracking loop.

26. A demodulator as claimed in claim 25 wherein said phase error compensator is a subtraction circuit.

27. A demodulator as claimed in claim 25 additionally comprising:

an alternate phase error compensator for generating an alternate adjusted phase angle for each symbol, said alternate phase error compensator having a first input coupled to said second delay circuit output, a second input, and an output;

a phase error offset generator having an input coupled to said alternate phase error compensator output and having an output;

an alternate integrator, having an input coupled to said phase error offset generator output and having an output coupled to said second input of said alternate phase error compensator, for forming an offset carrier phase tracking loop; and means, coupled to said integrator and to said alternate integrator, for selecting one of said phase error compensator and said alternate phase error compensator to recover said data.

28. A demodulator as claimed in claim 21 wherein said signal conveys data in a stream of symbols, and said symbol synchronizer comprises:

a first differential demodulator having an input coupled to said delay circuit output, having an output, and being configured to generate first frequency errors detected at first sections of said symbols;

a second differential demodulator having an input coupled to said delay circuit output, having an output, and being configured to generate second frequency errors detected at second sections of said symbols; and comparison means, coupled to said outputs of said first and second differential demodulators, for identifying whether frequency errors detected at said first symbol sections are smaller than frequency errors detected at said second symbol sections.

29. A method for acquiring an incoming signal that conveys data through a stream of symbols, said method comprising the steps of:

detecting first and second frequency errors for a plurality of symbols, said first and second frequency errors being detected for first and second sections of each symbol, respectively;

identifying whether said frequency errors detected at said first sections are smaller than frequency errors detected at said second sections; and synchronizing symbol timing in response to said identifying step.

30. A method as claimed in claim 29 wherein said detecting step also detects third frequency errors for said plurality of symbols, said third frequency errors being detected at third sections of each symbol, said identifying step determines which of said first, second, and third sections yields the smallest frequency errors, and said method additionally comprises the steps of:

continuing said detecting step after said synchronizing step; and reducing frequency errors for the one of said first, second, and third sections which has the smallest frequency error, said reducing step being responsive to frequency errors for the others of said sections.

31. A method as claimed in claim 30 wherein said reducing step comprises the step of adjusting symbol timing for said one of said sections which has the smallest frequency error toward the one of said sections which has the next smallest frequency error.

32. A method as claimed in claim 29 wherein said detecting step comprises the steps of:

differentially demodulating said incoming signal as defined during said first sections; and differentially demodulating said incoming signal as defined during said second sections.

33. A method as claimed in claim 29 additionally comprising, prior to said detecting step, the steps of:

generating samples which characterize said incoming signal during said first sections and during said second sections;

recording said samples;

monitoring said samples to detect a preamble, said monitoring step occurring during said recording step; and replaying said recorded samples after said preamble has been detected to produce replayed samples so that said detecting step operates on said replayed samples.

34. A method as claimed in claim 29 additionally comprising, after said synchronizing step, the step of coherently demodulating said incoming signal characterized in the one of said first and second sections which exhibits smaller frequency errors.

35. A method as claimed in claim 34 wherein said coherently demodulating step comprises the step of phase synchronizing first and second adaptive frequency references to said incoming signal as characterized in the one of said first and second sections which exhibits smaller frequency errors, said first and second adaptive frequency references initially being out of phase with one another.

36. A method as claimed in claim 34 wherein said coherently demodulating step comprises the step of operating a phase locked loop using only polar coordinates to track phase of said incoming signal.

* * * * *